United States Patent
Banker et al.

(10) Patent No.: US 10,337,485 B2
(45) Date of Patent: Jul. 2, 2019

(54) SYSTEMS AND METHODS FOR REDUCING ENGINE TORQUE THROUGH SPARK RETARD

(71) Applicant: Ford Global Technologies, LLC, Dearborn, MI (US)

(72) Inventors: Adam Nathan Banker, Canton, MI (US); Amey Y. Karnik, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/633,979

(22) Filed: Jun. 27, 2017

(65) Prior Publication Data

US 2018/0372056 A1    Dec. 27, 2018

(51) Int. Cl.
| | |
|---|---|
| F02P 5/15 | (2006.01) |
| F02D 41/00 | (2006.01) |
| F02D 41/02 | (2006.01) |
| F02D 41/12 | (2006.01) |

(52) U.S. Cl.
CPC .......... F02P 5/1504 (2013.01); F02D 41/008 (2013.01); F02D 41/0082 (2013.01); F02D 41/0085 (2013.01); F02D 41/023 (2013.01); F02P 5/1512 (2013.01); F02D 41/0235 (2013.01); F02D 41/12 (2013.01); F02D 2200/021 (2013.01); F02D 2200/0611 (2013.01); F02D 2200/0802 (2013.01); F02D 2200/101 (2013.01); F02D 2200/1002 (2013.01); F02D 2200/1015 (2013.01); F02D 2200/602 (2013.01); F02D 2250/18 (2013.01); F02D 2250/22 (2013.01)

(58) Field of Classification Search
CPC ...... F02P 5/1504; F02P 5/1512; F02P 5/1521; F02P 5/1522
USPC ............... 123/406.2, 406.21, 406.22, 406.23
See application file for complete search history.

(56) References Cited

U.S. PATENT DOCUMENTS

| | | | |
|---|---|---|---|
| 4,882,695 A * | 11/1989 | Mieno | F02D 37/02 701/111 |
| 5,479,898 A | 1/1996 | Cullen et al. | |
| 8,332,127 B2 | 12/2012 | Gwidt et al. | |
| 8,439,012 B2 | 5/2013 | Martin et al. | |
| 9,404,468 B2 * | 8/2016 | Glugla | F02P 5/145 |
| 9,523,341 B2 * | 12/2016 | Doering | B60W 30/19 |
| 9,545,909 B2 * | 1/2017 | Kiebel | B60W 10/06 |
| 9,732,722 B1 * | 8/2017 | Snyder | F02D 41/0085 |
| 9,835,521 B1 * | 12/2017 | Snyder | G01M 15/046 |
| 2003/0209224 A1 * | 11/2003 | Lee | F02P 5/1508 123/339.11 |

(Continued)

*Primary Examiner* — Sizo B Vilakazi
*Assistant Examiner* — Kevin R Steckbauer
(74) *Attorney, Agent, or Firm* — Julia Voutyras; McCoy Russell LLP

(57) ABSTRACT

Methods and systems are provided for reducing engine torque using spark retard. In one example, a method may include calculating a spark timing for each firing event of a plurality of firing events individually in order to achieve a desired amount of reduced torque as an average torque over the plurality of firing events. An occurrence of random misfire may be reduced by rounding the spark timing for each firing event of the plurality of firing events to a stable region or a misfire region.

19 Claims, 7 Drawing Sheets

(56) References Cited

U.S. PATENT DOCUMENTS

| | | | |
|---|---|---|---|
| 2015/0047607 A1* | 2/2015 | Glugla | F02P 5/145 123/406.23 |
| 2016/0069318 A1* | 3/2016 | Doering | B60W 30/19 477/102 |
| 2016/0090101 A1* | 3/2016 | Kiebel | B60W 10/06 701/101 |

* cited by examiner

SYSTEMS AND METHODS FOR REDUCING ENGINE TORQUE THROUGH SPARK RETARD

FIELD

The present description relates generally to systems and methods for reducing engine torque using spark retard.

BACKGROUND/SUMMARY

An internal combustion engine combusts an air/fuel mixture within cylinders to produce torque, which may be used to propel a vehicle. During vehicle operation, an engine controller regulates the amount of torque produced by the engine by controlling various operating parameters, including amounts of air and fuel provided to the cylinders and a timing of a spark produced by a spark plug to initiate combustion. A torque reduction may be requested due to a gear shift event or responsive to a driver tip-out event, among other torque reduction conditions. The controller may retard spark timing, throttle airflow, and/or cut fuel in response to the torque reduction request. Frequently, retarded spark timing is used to quickly reduce the amount of torque produced by the engine while maintaining the amount of fuel and air provided to the cylinders, whereas throttling airflow may be used when a slower response is sufficient.

However, the further spark timing is retarded from MBT timing, the lower the combustion stability and the greater the likelihood that misfire may occur. When a misfire occurs, no torque is produced by the firing event. Based on engine speed, there may be a spark timing range where the likelihood of random misfire occurrence increases. If spark is retarded into that region (herein also referred to as an unstable spark region) to provide the requested torque reduction, due to random occurrences of misfire, the amount of engine torque actually produced may significantly differ from what is requested. Further, since the amount of engine torque produced is unpredictable due to the randomness of the misfire occurrence, it may be difficult to compensate for.

One example approach for reducing random misfires while using spark retard to reduce engine torque is shown by Gwidt et al. in U.S. Pat. No. 8,332,127 B2. Therein, if a single injection of fuel is not predicted to combust at the retarded spark timing (e.g., due to misfire occurrence), a second fuel injection is provided. The second injection serves to form a rich cloud of fuel near the spark plug, which facilitates combustion when the retarded spark is provided. The net spark timing using the two fuel injections may be further retarded from the spark timing of the original single injection, and torque reduction is provided without misfire occurring.

However, the inventors herein have recognized potential issues with such systems. As one example, the actual torque reduction provided may be higher than desired. In other words, the reduction in misfire occurrence is associated with a torque penalty. In still other approaches, to operate spark timing outside of the unstable region, an engine controller may round the torque reduction request up or down. However, in all such cases, the actual spark retard provided is more or less than the spark retard that was requested. The resulting torque errors may cause engine performance to be degraded. If the torque reduction was requested during a transmission gear shift, the excess or deficient torque reduction may make the shift perceptible, and objectionable, to the operator. In addition, engine response during each torque reduction event may vary, reducing vehicle drivability. Further, the random misfire occurrence may cause the misfire count on a misfire monitor to be incremented, triggering misfire mitigation actions that may further disrupt the requested torque reduction.

In one example, the issues described above may be addressed by a method for an engine comprising: responsive to an estimated spark timing for a requested torque reduction being between an upper threshold and a lower threshold, adjusting a spark timing for each firing event of a plurality of firing events to bring an average spark timing over the plurality of firing events to the estimated spark timing. In this way, a requested torque reduction can be provided while reducing random misfire occurrence.

As one example, responsive to a torque reduction request, such as due to a transmission gear upshift, an engine controller may determine an amount of spark timing retard to apply to each cylinder over an engine cycle to provide the requested torque reduction. If the target retarded spark timing falls in an unstable region where random misfires can occur, the controller may recalculate the spark timing for each cylinder so that the average spark timing across the cylinders is maintained at the target spark timing. For example, the spark timing retard applied for a first cylinder (or first number of cylinders) may be adjusted to be lower than the target spark timing retard, resulting in less torque reduction for that cylinder(s). The spark timing retard applied for a second cylinder (or second number of cylinders) may be adjusted to be higher than the target spark timing retard, resulting in more torque reduction for that cylinder(s). By adjusting the number and identity of cylinders that get more or less torque than desired, the average spark timing can be adjusted to provide the requested torque reduction. For example, the unstable region may be defined by upper and lower thresholds, and based on the position of the target retarded spark timing within the unstable region, relative to the upper and lower thresholds, the spark timing of individual cylinders may be adjusted. This may include adjusting spark timing over the cylinders symmetrically (e.g., in a four cylinder engine, two cylinders may be moved above the upper threshold while another two are moved below the lower threshold) or asymmetrically (e.g., in a four cylinder engine, one cylinder may be moved above the upper threshold while the remaining three are moved below the lower threshold). As such, cylinders whose spark timings are moved below the lower threshold may misfire; however, since this is a planned and controlled misfire, a misfire count is not incremented and a misfire monitor is not triggered.

In this way, a desired amount of torque reduction can be provided while operating an engine with spark timing outside of an unstable region. The technical effect of adjusting spark timing for some cylinders to provide more torque reduction than desired while adjusting the spark timing of other cylinders to provide less torque reduction than desired is that any amount of torque reduction can be provided, on average, through the use of spark retard. By reducing the need to round up or down a spark timing to reduce random misfire occurrence, engine torque errors are reduced, while allowing for a more consistent engine response and a smoother shift between gears. By shifting the spark timing of some cylinders to a region where misfire occurrence can be controlled, the drop in torque provided by the controlled misfire event can be advantageously used to provide the requested torque reduction. Overall, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
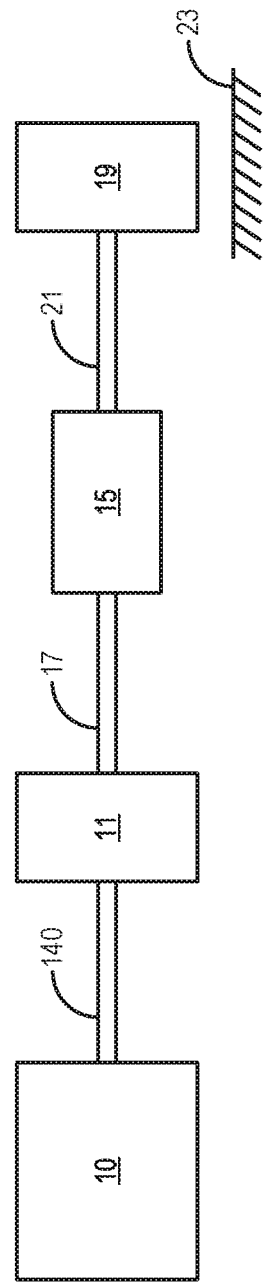
FIG. 1 illustrates an example vehicle powertrain.
Figure 6:
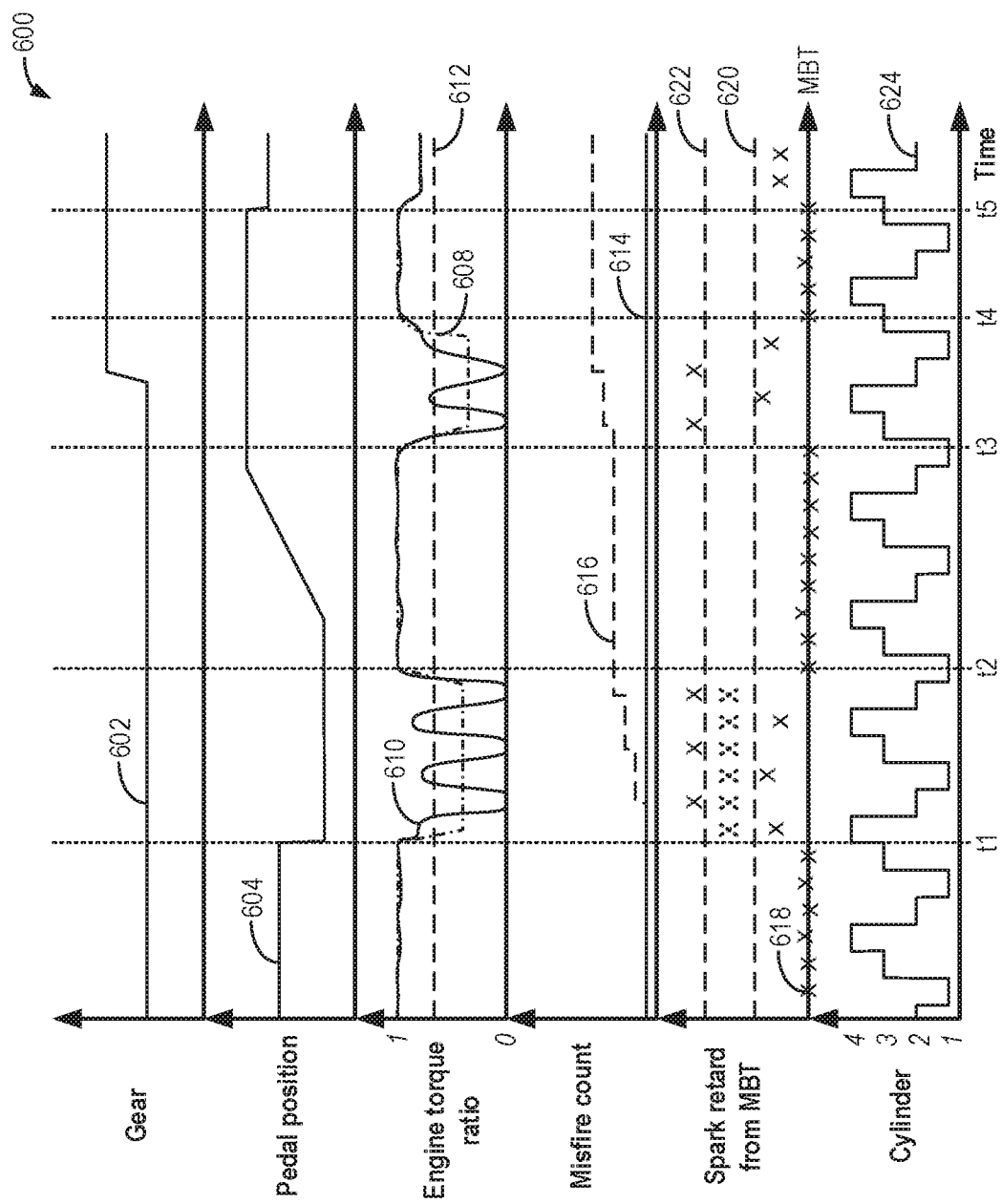
FIG. 6 depicts a prophetic example of retarding spark timing responsive to a request for a torque reduction request.
Figure 7:
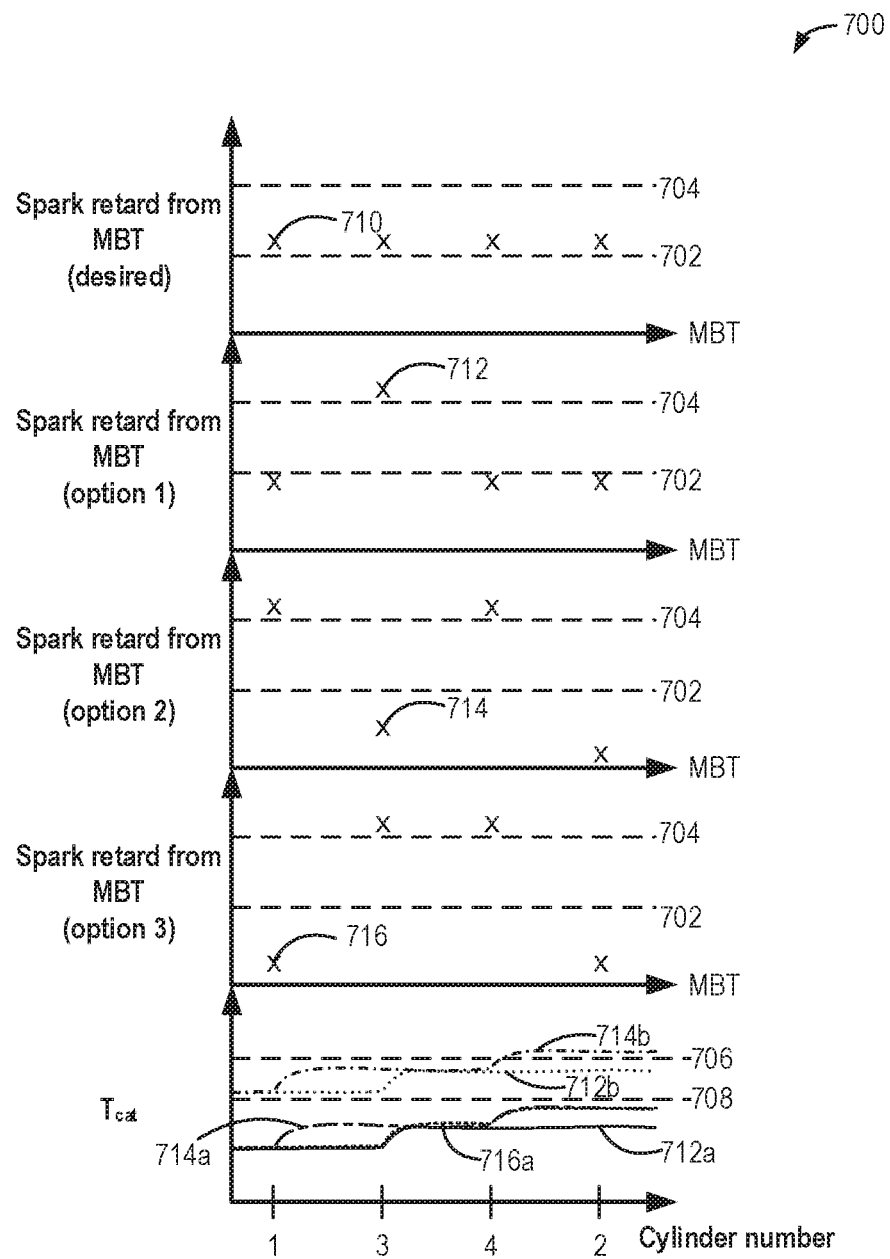
FIG. 7 shows example spark timing retard patterns that may reduce engine torque across a plurality of firing events while controlling misfire.

The following description relates to systems and methods for reducing an amount of torque produced by an engine in a vehicle powertrain, such as the vehicle powertrain shown in FIG. 1, through retarded spark timing. The torque may be produced by spark-igniting an air/fuel mixture in cylinders of the engine, such as in the example engine system of FIG. 2. A timing of the spark may be retarded by an engine controller responsive to a torque reduction request, such as according to the example control routine of FIG. 3. When the spark timing occurs in a region where random misfire occurrence is increased, as diagrammed in FIG. 4, the controller may readjust spark timing for each cylinder of an engine cycle in order to achieve the torque reduction across a plurality of firing events of the cycle. For example, the controller may use an algorithm, such as the algorithm schematically shown in FIG. 5, to redistribute spark timing for each cylinder to outside the region (e.g., above or below) to achieve the desired torque reduction, on average, across the plurality of firing events. A prophetic example of using spark retard redistribution to reduce engine torque is shown in FIG. 6. Further, different spark retard patterns, such as symmetric and asymmetric patterns, may be used to reduce engine torque, as illustrated in FIG. 7.

Figure 2:
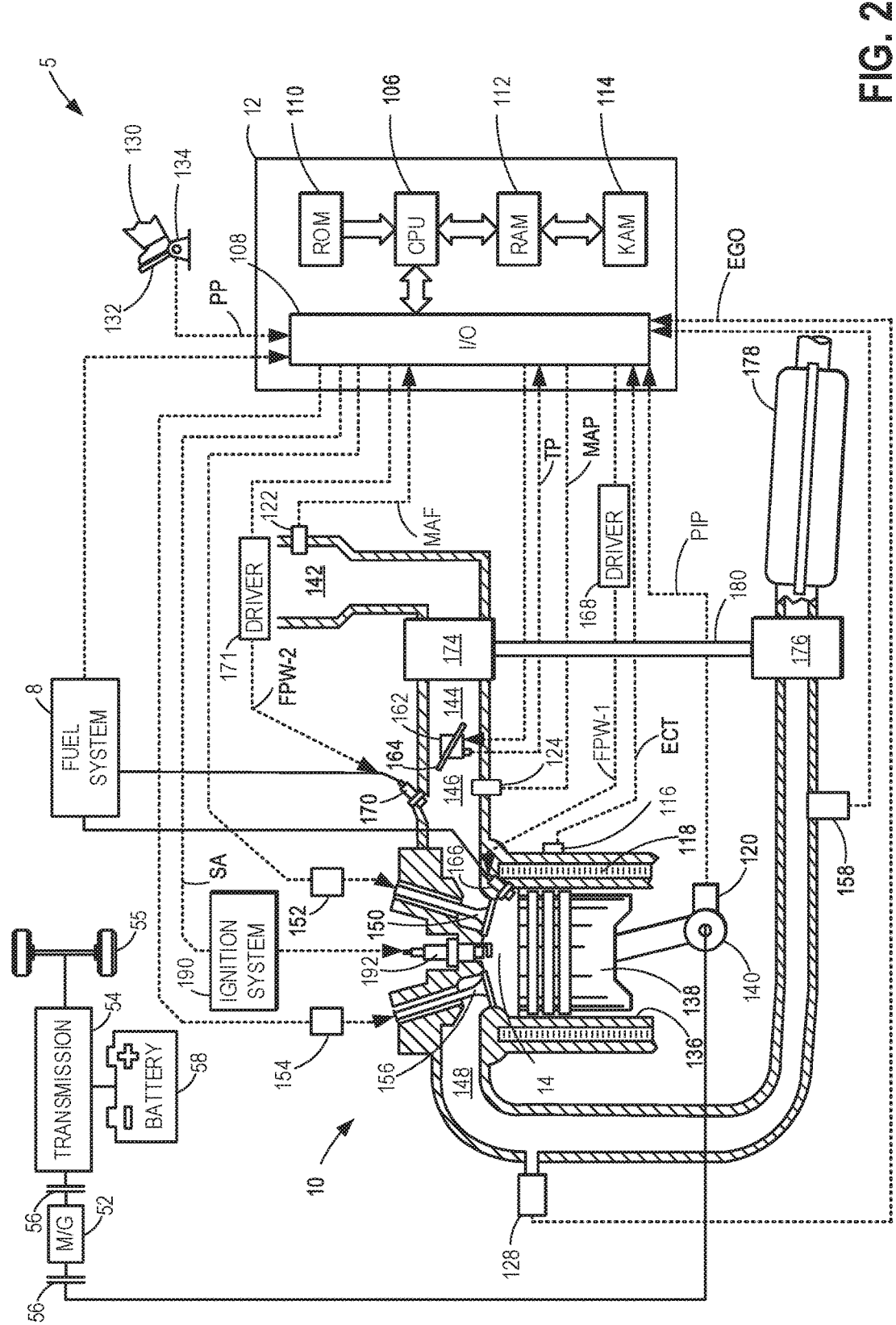
FIG. 2 shows an example engine system that may be included in a vehicle powertrain.

Referring to FIG. 1, an internal combustion engine 10, further described herein with particular reference to FIG. 2, is shown coupled to a torque converter 11 via a crankshaft 140 in a powertrain. Torque converter 11 is also coupled to a transmission 54 via a turbine shaft 17 (also referred to herein as a transmission input shaft). In one embodiment, transmission 54 comprises an electronically controlled transmission with a plurality of selectable speed ratios. Transmission 54 may also comprise various other gears, such as a final drive ratio (not shown). In the depicted example, transmission 54 is a continuously variable transmission (CVT). The CVT may be an automatic transmission that can change seamlessly through a continuous range of effective speed ratios, in contrast with other mechanical transmissions that offer a finite number of fixed gear ratios (speed ratios). The speed ratio flexibility of the CVT allows the transmission input shaft to maintain a more optimized angular velocity. By adjusting a speed ratio of the CVT, an engine controller may be configured to vary an engine speed-load profile while maintaining a demanded power output of the engine. For example, an engine speed may be lowered while an engine load is correspondingly increased to maintain a power output by adjusting the CVT to a lower speed ratio (e.g., upshifting to a higher gear). As another example, an engine speed may be raised while an engine load is correspondingly decreased to maintain a power output by adjusting the CVT to a higher speed ratio (e.g., downshifting to a lower gear).

Torque converter 11 may have a clutch (not shown) that can be engaged, disengaged, or partially engaged. When the clutch is either disengaged or being disengaged, the torque converter is said to be in an unlocked state, whereas when the clutch is engaged, the torque converter is said to be in a locked state. For example, when the torque converter is locked, all of the torque generated by engine 10 may be transferred to turbine shaft 17.

Note that in one example embodiment, the powertrain of FIG. 1 is coupled in a passenger vehicle that travels on a road 23. Thus, transmission 54 may further be coupled to a vehicle wheel 55 via an axle 21. Vehicle wheel 55 interfaces the vehicle (not shown) to the road 23. While various vehicle configurations may be used, in one example, the engine is the sole motive power source, and thus, the vehicle is not a hybrid-electric, hybrid-plug-in, etc. In other embodiments, the engine may be incorporated into a hybrid vehicle, as described further below.

FIG. 2 depicts an example embodiment of a combustion chamber (or cylinder) 14 of an internal combustion engine 10, which may be engine 10 of FIG. 1. As such, like components of FIGS. 1 and 2 are numbered the same. For example, engine 10 may be coupled in a vehicle 5, such as with the powertrain of FIG. 1.

Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to crankshaft 140 so that reciprocating motion of the piston is translated into rotational motion of the crankshaft. Crankshaft 140 may be coupled to at least one drive wheel 55 of the passenger vehicle via a transmission 54, as described further with respect to FIG. 1. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 2 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 2, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen); a two-state oxygen sensor or EGO (as depicted); a HEGO (heated EGO); or a NOx, HC, or CO sensor, for example. Emission control device 178 may be a three way catalyst (TWC), a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT to prevent an occurrence of knock. In still other examples, spark may be retarded from MBT to rapidly reduce engine torque, such as due to a decrease in driver-demanded torque or a transmission gear shift event, as further described with respect to FIGS. 3-5.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 2 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146 rather than coupled directly to cylinder 14 in a configuration that provides what is known as port injection of fuel (hereafter also referred to as "PFI") into an intake port upstream of cylinder 14. Fuel injector 170 may inject fuel received from fuel system 8 in proportion to the pulse width of a signal FPW-2 received from controller 12 via an electronic driver 171. Note that instead of multiple electronic drivers (such as electronic driver 168 for fuel injector 166 and electronic driver 171 for fuel injector 170, as depicted), a single electronic driver may be used for both fuel injectors.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered to cylinder 14 by both injectors during a single cycle of the cylinder. For example, each injector may deliver a portion of a total fuel amount that is combusted in cylinder 14. Further, the distribution and/or relative amount of fuel delivered by each injector may vary with operating conditions, such as engine load, knock, and exhaust temperature. The port injected fuel may be delivered during an open intake valve event, a closed intake valve event (e.g., substantially before the intake stroke), as well as during both open and closed intake valve operation. Similarly, directly injected fuel may be delivered at least partially during a previous exhaust stroke, during an intake stroke, and during a compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, such as one injector having a larger injection hole than the other, for example. Other differences include, but are not limited to, different spray angles, different operating temperatures, different targeting, different injection timing, different spray characteristics, different locations, etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 2 as a microcomputer, including microprocessor unit 106, input/output ports 108, an electronic storage medium for executable programs (e.g., executable instructions) and calibration values shown as non-transitory read only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature. Controller 12 receives signals from the various sensors of FIG. 2 and employs the various actuators of FIG. 2 to adjust engine operation based on the received signals and instructions stored on a memory of the controller. For example, based on a decrease in accelerator pedal position, received by controller 12 as signal PP, the controller may decrease engine torque by retarding a timing of signal SA sent to ignition system 190, thereby retarding a timing of the spark provided by spark plug 192, as described further with respect to FIG. 3.

Further, controller 12 may use sensors and actuators of the engine system to determine that a misfire has occurred. A misfire may occur due to an overly lean AFR, a degraded spark plug, or spark timing being retarded beyond a threshold, for example. In one example, misfire may be determined based on signal PIP after a firing event. That is, if crankshaft 140 does not accelerate following the firing event, it may be determined that combustion did not occur in the cylinder. If the misfire occurs randomly (e.g., is not planned), the controller may increment a misfire counter so that, after a threshold number of misfires is reached, a diagnostic trouble code may be set and/or a vehicle operator alerted so that the source of the random misfires may be determined and addressed accordingly in order to prevent further engine system degradation. However, if the misfire is planned by the controller, as described further herein, the controller may not increment the misfire counter because the misfire is controlled and not due to degradation within the engine system.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

In this way, the components of FIGS. 1 and 2 provide for a system comprising: an engine including a plurality of cylinders; a spark plug coupled to each of the plurality of cylinders; a transmission; and a controller with computer-readable instructions for: responsive to a change in driver demand, commanding a transmission upshift to a lower gear ratio; estimating a torque reduction based on the transmission upshift; and adjusting a spark timing for each of the plurality of cylinders on a cylinder-by-cylinder basis to provide an average spark timing retard that generates the estimated torque reduction. In one example, the controller may additionally or optionally include further instructions for estimating each of an upper and a lower threshold for spark timing retard based on engine speed, engine load, engine temperature, and fuel alcohol content, and wherein the adjusting is responsive to the average spark timing retard falling between the upper and the lower thresholds. The adjusting may further include operating a first set of the plurality of cylinders with a first spark timing retard above the upper threshold; and operating a second set of the plurality of cylinders with a second spark timing retard below the lower threshold, wherein a number and identity of cylinders in each of the first and second set is selected based on the average spark timing retard relative to each of the upper and the lower threshold. In another example, the controller may additionally or optionally include further instructions for: monitoring an exhaust temperature; and responsive to the monitored exhaust temperature exceeding a threshold temperature, increasing the number of cylinders in the second set while decreasing the number of cylinders in the first set.

Figure 3:
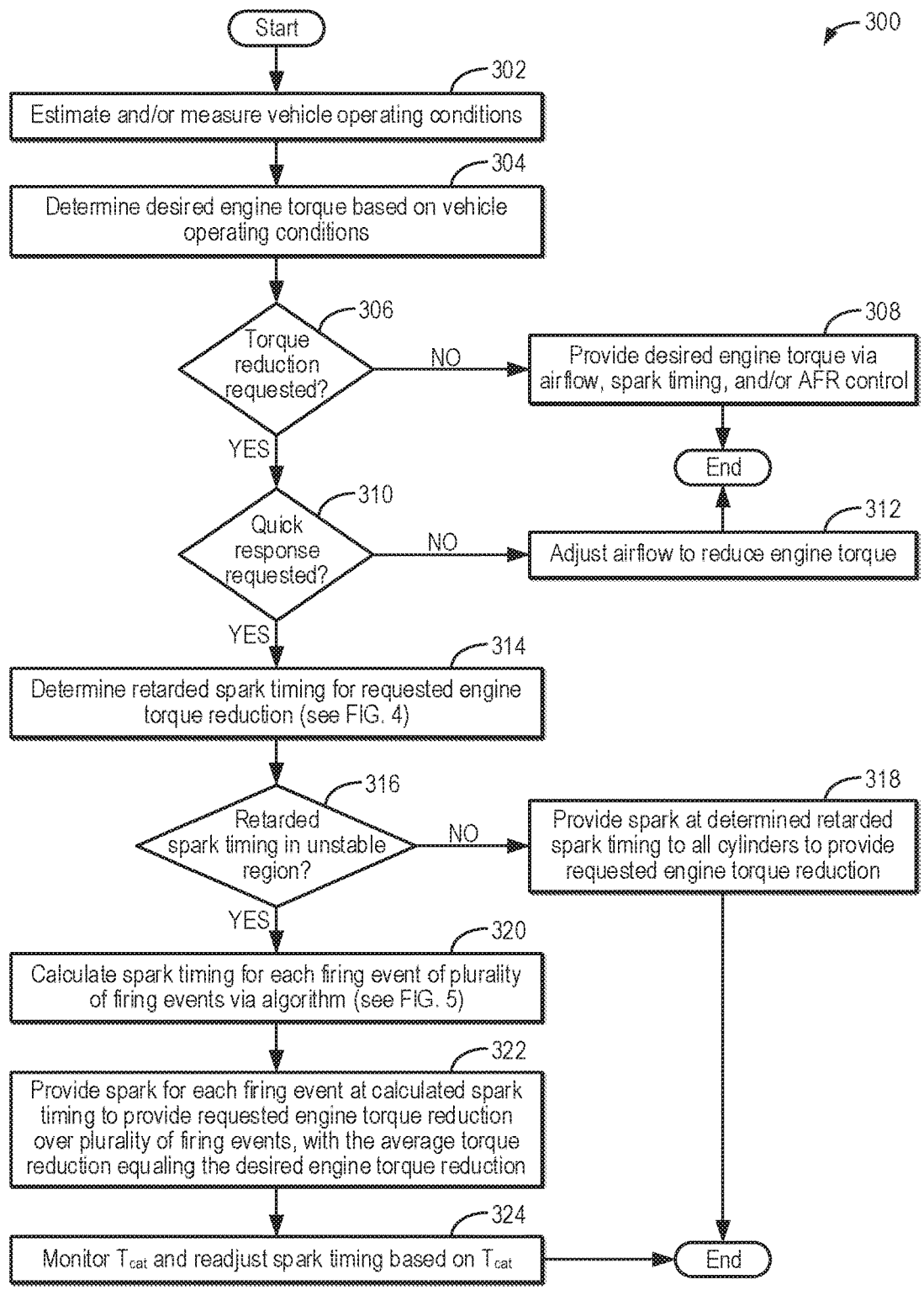
FIG. 3 depicts a high-level flow chart of an example method for retarding spark timing to reduce engine torque.

Turning now to FIG. 3, an example method 300 for reducing engine torque through spark retard usage is shown. Specifically, method 300 prevents random misfire events due to spark timing in an unstable region by utilizing an algorithm that rounds spark timing of individual cylinders up or down to move the spark timing of each cylinder out of the unstable region while still providing the desired torque reduction on average over an engine cycle. Instructions for carrying out method 300 and the rest of the methods included herein may be executed by a controller (e.g., controller 12 of FIG. 2) based on instructions stored on a memory of the controller and in conjunction with signals received from sensors of the engine system, such as the sensors described above with reference to FIG. 2, including signal PP from a pedal position sensor. The controller may employ engine actuators of the engine system to adjust engine operation, such as providing spark via a spark plug (e.g., spark plug 192 of FIG. 2) according to the methods described below.

Method 300 begins at 302 and includes estimating and/or measuring vehicle operating conditions. Operating conditions may include, for example, engine speed, engine load, accelerator pedal position, barometric pressure, engine temperature, battery state of charge, a selected gear (e.g., in transmission 54 of FIGS. 1 and 2), a status of a torque converter (e.g., torque converter 11 of FIG. 1), etc.

At 304, method 300 includes determining desired engine torque based on vehicle operating conditions. For example, the accelerator pedal position refers to a driver torque demand, which is a wheel torque request needed to achieve a desired vehicle speed and/or rate of acceleration. The controller may determine the amount of desired engine torque needed to produce the wheel torque request via a look-up table, a map, an algorithm, and/or an equation, each stored as a function of the vehicle operating conditions, including the pedal position, the selected gear, the status of the torque converter, engine speed, engine load, etc.

At 306, it is determined if a torque reduction is requested. A torque reduction request may correspond to the desired engine torque being less than a current engine torque by more than a threshold amount. For example, the torque reduction may be requested in response to a tip-out condition where the operator releases the accelerator pedal. In another example, the torque reduction may be requested in response to a gear shift event, such as during an upshift from a first gear with a higher speed ratio to a second gear with a lower speed ratio. In still another example, the torque reduction may be requested for traction control purposes, such as to prevent wheel slip. Torque reduction may also be requested for engine speed control (such as to limit engine speed), for tip-in anti-clunk, during transitions between modes in a variable displacement engine (such as when transitioning to operating with one or more (additional) cylinders deactivated, or when transitioning to operating with one or more (additional) cylinder reactivated), and for restart engine speed profile shaping in a stop/start engine, for example.

If a torque reduction is not requested, method 300 proceeds to 308 and includes providing the desired engine torque via airflow, spark timing, and/or air-fuel ratio (AFR) control. That is, an amount of air and/or fuel provided to the engine and the spark timing may be coordinated to produce the desired engine torque. For example, the controller may adjust an opening of a throttle valve (e.g., throttle valve 162 of FIG. 2) to adjust airflow, the airflow increasing as the opening of the throttle valve increases, the opening of the throttle valve increasing as torque demand increases. Further, if the engine is operating in a boosted condition, the amount of boost provided may be adjusted by adjusting a speed of a compressor (e.g., turbocharger compressor 174 of FIG. 2), such as by adjusting an opening of a turbocharger wastegate, with the amount of boost increasing as the opening of the wastegate decreases (thereby increasing the speed of a turbine and thereby the speed of the compressor). As another example, spark may be provided at or near MBT in order to maximize engine power for the given engine load. As still another example, an amount of fuel provided may be adjusted by adjusting pulse widths of signals (e.g., FPW-1 and/or FPW-2) provided to one or more fuel injectors (e.g., fuel injectors 166 and 170 of FIG. 2, respectively), thereby adjusting the AFR, with the amount of fuel provided increasing as the pulse widths increase. Lean mixtures may have reduced torque relative to stoichiometry, whereas slightly rich mixtures may have increased torque relative to stoichiometry, which then decreases below that of stoichiometry as the richness increases. The controller may refer a look-up table stored as a function of engine speed and load to determine the desired AFR as well as the fuel split ratio between DI and PFI to provide the desired AFR. Following 308, method 300 ends.

If torque reduction is requested at 306, method 300 proceeds to 310 and includes determining if a quick response is requested. For example, a quick response may be requested in response to a transmission upshift being requested or responsive to a tip-out event occurring over less than a threshold duration. Rapid torque reduction may be requested during a transmission gear shift to enable a smooth shift that is largely not perceptible by the operator. In one example, a quick response refers to a torque reduction request that occurs over 250 ms or less.

If a quick torque reduction response is not requested, method 300 proceeds to 312 and includes adjusting airflow to reduce engine torque. For example, an opening of the throttle valve may be decreased and/or the compressor speed may be reduced (if boost is provided) to decrease an amount of air provided to the engine. The amount of fuel provided may then be adjusted accordingly in order to achieve a desired AFR. For example, as the amount of air provided to the engine decreases, the amount of fuel provided to the engine is decreased accordingly in order to maintain the desired AFR (e.g., at stoichiometry). Further, spark timing may be correspondingly adjusted, for example, in order to maintain a timing relative to MBT, which may be determined based on engine speed and load, as described above with respect to FIG. 2. Following 312, method 300 ends.

Figure 4:
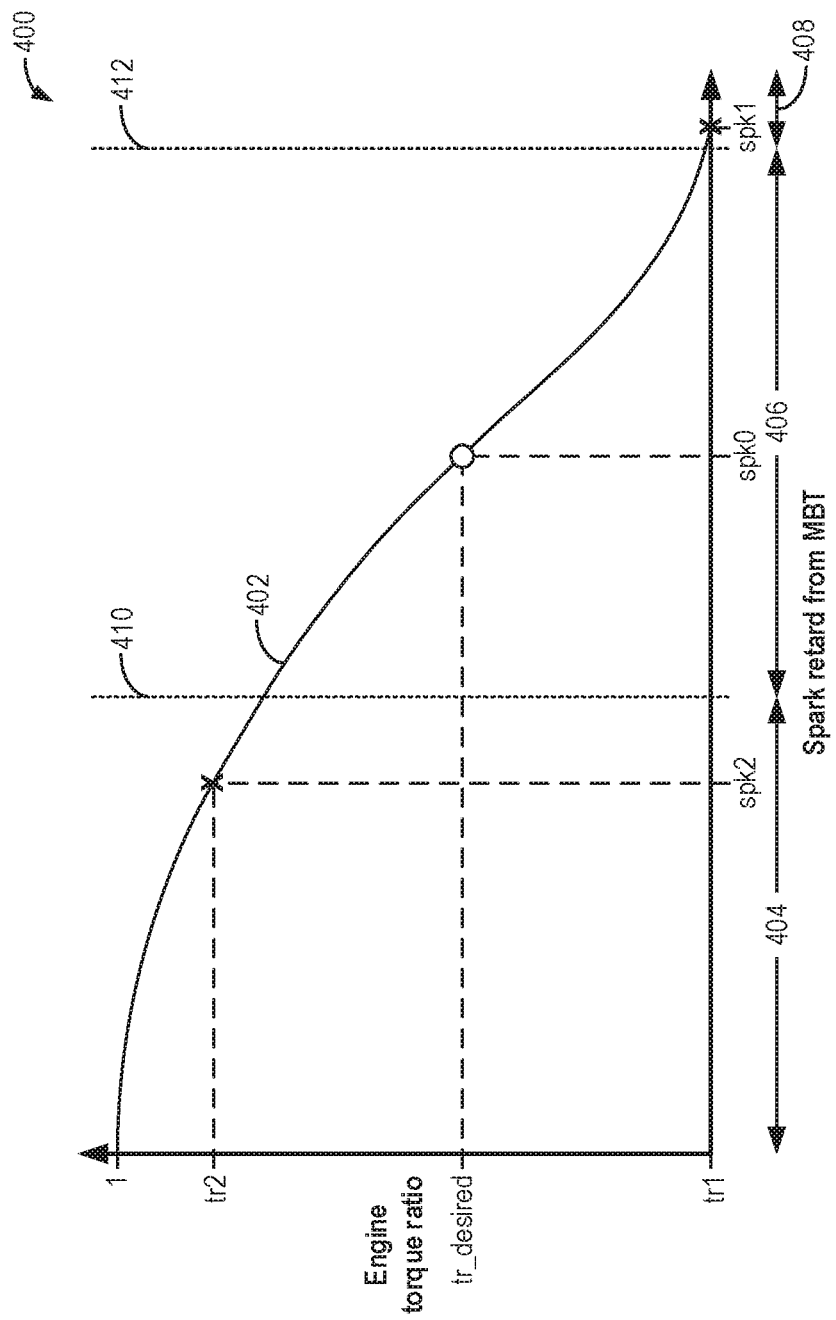
FIG. 4 is an example graph illustrating the relationship between spark retard and engine torque ratio.

If a quick torque reduction response is requested, method 300 proceeds to 314 and includes determining a retarded spark timing for the desired torque reduction. Turning briefly to FIG. 4, an example graph 400 of the relationship between spark timing and engine torque ratio is shown. Spark retard from MBT is shown on the X-axis, with the amount of retard increasing from left to right, and engine torque ratio is shown on the Y-axis, with the ratio increasing from bottom to top. The engine torque ratio is the ratio of engine torque delivered at a particular spark timing to the engine torque delivered at MBT spark. Thus, when the engine is operating at MBT spark, the torque ratio is 1, and when the engine is operating at a spark timing retarded from MBT, the resulting torque ratio is a dimensionless fractional value (e.g., 0.9, 0.7, etc.). As such, a torque ratio of 0.9 corresponds to a 10% reduction in indicated torque from MBT.

The controller may determine a desired torque ratio to achieve the requested engine torque reduction based on the amount of desired torque and an amount of torque the engine is capable of producing at the current operating conditions using a look-up table, map, or function. The controller may then determine the spark timing (e.g., degrees retarded from MBT) that would result in the desired torque ratio using the function illustrated by plot 402. However, as the spark timing becomes increasingly retarded, combustion stability is reduced, increasing the likeliness of misfire. The spark retard from MBT may be divided into three regions: a stable region 404, an unstable region 406, and a misfire region 408. The stable region refers to a range of spark timings that are not expected to result in a misfire. The unstable region refers to a range of spark timings at a given engine speed and load in which random misfire occur. The misfire region refers to a range of spark timings where misfire is predictably expected to occur. Thus, dashed line 410 represents a first, lower spark retard threshold below which combustion is expected to be stable (e.g., misfire is not expected to occur) and dashed line 412 represents a second, higher spark retard threshold above which controlled misfire is expected to occur. In the previous example, "below" refers to spark that is less retarded from MBT compared to the first, lower threshold 410, and "above" refers to spark that is further retarded from MBT compared to the second, higher threshold 412. An example given in FIG. 4 will be discussed further below.

Returning to FIG. 3, at 316, it is determined if the determined retarded spark timing is in the unstable region (e.g., region 406 of FIG. 4). For example, the determined retarded spark timing may be in the unstable region if it is both more retarded than (e.g., above) a first, lower spark retard threshold (e.g., dashed line 410 of FIG. 4) and less retarded (e.g., below) than a second, higher spark retard threshold (e.g., dashed line 412 of FIG. 4). The first and second thresholds may be determined based on engine speed, engine load, engine temperature (e.g., engine coolant temperature, or ECT), intake or ambient air temperature, fuel octane, and fuel ethanol content. For example, as engine speed increases, the first and second thresholds may be lowered, as misfire may be more prevalent at higher speed conditions. In another example, as engine load increases, the first and second thresholds may be increased, as misfire may be less prevalent at higher load conditions. As an example, the controller may refer a look-up table stored as a function of engine speed, engine load, ECT, air temperature, fuel octane, and fuel ethanol content to determine the first and second thresholds.

If the determined retarded spark timing is not in the unstable region, method 300 proceeds to 318 and includes providing spark at the determined retarded spark timing to all cylinders to provide the requested engine torque reduction. Thus, spark will be provided at the same timing (the determined retarded spark timing) to all cylinders, and all of the cylinders will produce the same amount of reduced engine torque. Following 318, method 300 ends.

If the retarded spark timing is in the unstable region, method 300 proceeds to 320 and includes calculating a spark timing for each firing event of a plurality of firing events (such as over an engine cycle, where each cylinder is fired once) via an algorithm so that the average spark timing across the plurality of firing events is at the desired retarded spark timing. By shifting the spark timing of some cylinders to below the first threshold (which provides less torque reduction than desired) and that of others to above the second threshold (which provides more torque reduction than desired), the desired torque reduction can be achieved while reducing random misfire occurrence. The algorithm for redistributing spark timing is further described with respect to FIG. 5.

At 322, method 300 includes providing spark for each firing event at the calculated spark timing to reduce engine torque over the plurality of firing events, with the average torque reduction equaling the desired engine torque reduction. Thereby, the average engine torque produced over the plurality of firing events is equal to the requested engine torque reduction even though the spark timing (and the amount of torque produced) for each cylinder varies. Further, when the provided spark timing causes a planned misfire, the controller will not increment a misfire counter.

At 324, method 300 includes monitoring a temperature of a catalyst ($T_{cat}$) and readjusting spark timing based on $T_{cat}$. For example, $T_{cat}$ may be measured directly or may be determined by measuring an exhaust temperature (e.g., as measured by temperature sensor 158 of FIG. 2). Whether planned or unplanned, misfires may increase $T_{cat}$. High temperatures may degrade the catalyst (e.g., emission control device 178 of FIG. 2), which may lead to increased emissions. Therefore, when $T_{cat}$ reaches a threshold temperature, a number of cylinders undergoing planned misfires may be decreased, as described further with respect to FIG. 7. Decreasing the number of cylinders undergoing planned misfires may include increasing the number of cylinders with calculated spark timings that are below the first threshold, with the calculated spark timings adjusted to be closer to the first threshold in order to provide less torque through each firing event. Following 324, method 300 ends.

Turning back to FIG. 4, an example of reducing engine torque across two firing events in order to achieve a desired torque ratio is shown. The desired torque ratio, tr_desired, corresponds to a spark timing spk0 for the two firing events, which is in the unstable region 406. Thus, spark for the two firing events is not provided at spark timing spk0, as indicated by the open circle. Instead, the controller uses an algorithm (e.g., algorithm 500 of FIG. 5) to produce the desired torque ratio as an average across the two firing events. A first torque ratio, tr1 (equal to a torque ratio of zero), is achieved by providing spark at a spark timing spk1 to a first cylinder. Spk1 is in the misfire region 408 (e.g., is more retarded than the second, higher threshold 412), and therefore, controlled misfire occurs in the first cylinder and the first cylinder produces zero torque. A second torque ratio, tr2, is achieved by providing spark at a spark timing spk2 to a second cylinder. Spk2 is in the stable region 404 (e.g., is less retarded than the first, lower threshold 410), and so combustion occurs in the second cylinder, producing torque at a torque ratio of tr2. The average of tr1 and tr2 equals tr_desired. Further, the average of spk1 and spk2 is equal to spk0. In this way, the desired torque ratio is achieved as an average torque ratio across two firing events. Note that two firing events are used as a non-limiting example, and the actual number of firing events over which a torque reduction is achieved may be more than two. For example, the torque reduction may be adjusted over each engine cycle, where each cylinder fires once. Thus, instead of each of cylinders 1 through 4 of a 4-cylinder engine firing at spk0, a first number of cylinders 1 through 4 fire at spk1, and a second number of cylinders 1 through 4 fire at spk2, with the first and second numbers selected based on various criteria so that various combinations can be provided.

Figure 5:
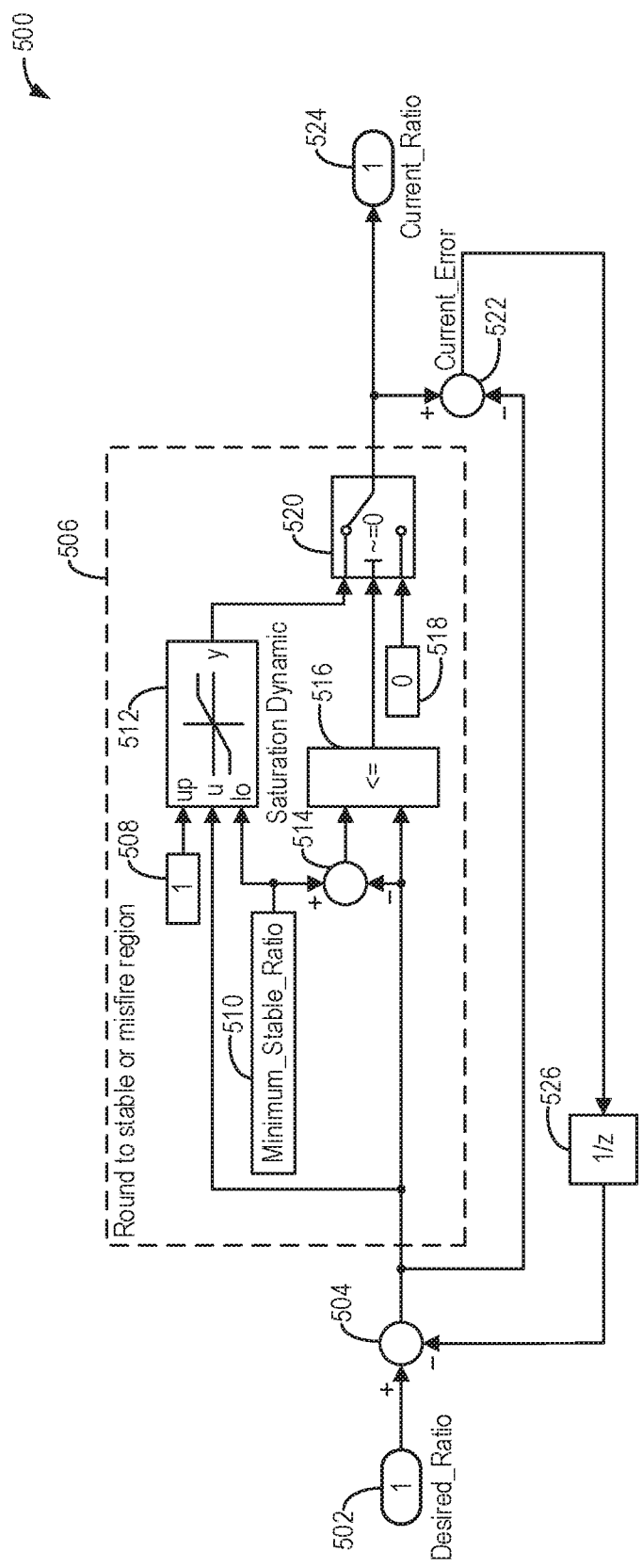
FIG. 5 shows a block diagram of an example algorithm for calculating retarded spark timing for individual firing events.

FIG. 5 shows a block diagram of an example algorithm 500 for calculating a sparking timing of each firing event for a plurality of firing events in order to achieve an average torque ratio corresponding to a desired torque ratio that is in an unstable spark timing region. Algorithm 500 is performed once for each firing event using feedback from a previous firing event. For each firing event, algorithm 500 determines what torque reduction should be used at the event based on the current torque reduction request (e.g., the desired torque ratio) and the error on the previous event, as described further below. The plurality of firing events is not predetermined number; a controller (e.g., controller 12 of FIG. 2) may continue to apply algorithm 500 while the desired torque ratio remains in the unstable spark timing region.

A desired torque ratio 502 ("Desired_Ratio") is input into an adder element 504. Desired torque ratio 502 corresponds to the desired torque ratio that is in the unstable spark timing region. A feedback signal regarding a current error ("Current_Error") of the torque ratio is determined based on a difference between a current torque ratio 524 ("Current_Ratio"), corresponding to a cylinder torque ratio of the previous firing event, and the desired torque ratio 502. The current error is subtracted from the desired torque ratio 502 at adder element 504 after being transformed by a digital filter 526. The resulting signal, which is a desired cylinder torque ratio before rounding for the firing event, is input into an algorithm 506, which determines whether the spark timing for the firing event will be rounded to a stable region or a misfire region. A spark timing at MBT ("1") 508, a Minimum Stable_Ratio 510, which is a lower spark timing threshold below which combustion is unstable (e.g., first, lower threshold 410 of FIG. 4), and a "0" 518, which is an upper spark timing threshold below which misfire is expected to occur (e.g., second, higher threshold 412 of FIG. 4), are also input to algorithm 506. Note that in the example of algorithm 500, the upper spark timing threshold 518 is equal to a torque ratio of zero, but in other examples, other torque ratios may be possible. Parts 514 and 516 compare whether the desired cylinder torque ratio before rounding is closer to the lower spark timing threshold 510 or the upper spark timing threshold 518. A part 512 provides a desired cylinder torque ratio in the stable region by saturating the desired cylinder torque ratio before rounding to values in the stable region. A part 520 sets a new Current_Ratio 524, which is a cylinder torque ratio for the current firing event, by selecting the threshold that is closer to the desired cylinder ratio before rounding or by directly selecting the desired cylinder ratio before rounding if it is in the stable region. Therefore, Current_Ratio 524, the output of algorithm 500, corresponds to a spark timing that is in the stable region or the misfire region, but not in the unstable region. An adder element 522 calculates a new Current_Error by subtracting the desired cylinder ratio before rounding from Current_Ratio 524. The new Current_Error is then subtracted from Desired_Ratio 502 at adder element 504 for the next firing event.

FIG. 6 depicts a prophetic example 600 of robustly reducing engine torque through spark retard redistribution. For example, a controller, such as controller 12 of FIG. 2, may reduce engine torque responsive to an engine torque reduction request according to a control routine (e.g., method 300 of FIG. 3). Transmission gear selection is shown in plot 602, accelerator pedal position is shown in plot 604, a desired engine torque ratio is shown in plot 608 (dashed and dotted line), an actual engine torque is shown in plot 610 (solid line), a misfire count is shown in plot 614, an applied spark retard from MBT is shown in plot 618, with each X representing one combustion event at the indicated spark timing, and the identity of the firing cylinder number is shown in plot 624. The non-limiting example of FIG. 6 shows a four-cylinder engine with a firing order of 1-3-4-2, but other examples may have a different number of cylinders and other firing orders. Further, a threshold engine torque ratio is represented by dashed line 612, a first, lower spark retard threshold is represented by dashed line 620, and a second, higher spark retard threshold is represented by dashed line 622. The threshold engine torque ratio corresponds to a torque ratio below which the corresponding spark timing is in an unstable region (e.g., unstable region 406 of FIG. 4) or a misfire region (e.g., misfire region 408 of FIG. 4), and the first, lower and the second, higher spark retard thresholds define the unstable spark timing region. Note that while the threshold engine torque ratio 612, the first, lower spark retard threshold 620, and second, higher spark retard threshold 622 are illustrated as constant, in other examples, the thresholds may vary with engine speed, engine temperature, air temperature, fuel octane, fuel and alcohol content. For all of the above, the X-axis represents time, with time increasing along the X-axis from left to right. The Y-axis represents the labeled parameter, with values increasing from bottom to top.

Prior to t1, the engine is operated with constant driver demand, indicated by a constant pedal position (plot 604). The transmission gear (plot 602) remains constant, with no shift events occurring. The desired engine torque ratio (plot 608) is one, and so spark is provided at or near MBT (plot 618) in order to achieve an engine torque ratio of one (plot 610), corresponding to maximum engine efficiency for the operating conditions (including engine speed, engine load, and exhaust gas AFR, for example), as further described with respect to FIG. 2. With spark timing at MBT, misfire does not occur, and so the misfire count (plot 614) does not increase.

At t1, a tip-out event occurs, as demonstrated by an abrupt decrease in accelerator pedal position (plot 604). A quick reduction in engine torque is requested (e.g., the tip out event occurs over a short duration), as shown in plot 608. However, the desired engine torque ratio (plot 608) is less than the threshold engine torque ratio (dashed line 612), indicating that the spark timing to provide the desired engine torque ratio lies in the unstable spark timing region (e.g., above the first, lower threshold 620 and below the second, higher threshold 622). Therefore, the controller uses an algorithm (e.g., algorithm 500 of FIG. 5) to determine spark timing for each firing (e.g., combustion) events to produce an average torque ratio equal to the desired torque ratio, with each spark timing (and corresponding torque ratio) rounded to a stable region (e.g., stable region 404 of FIG. 4), where misfire is not expected to occur, or to the misfire region, where misfire is expected. The algorithm is performed once per firing event, with the algorithm determining what torque reduction to be used at each firing event based on the desired engine torque ratio (plot 608), which corresponds to a current torque reduction request, and a torque error of the previous firing event, as further described with respect to FIG. 5. In this example, the average torque ratio equals the desired torque ratio over six firing events.

The first combustion event following the tip-out occurs in cylinder 4 (plot 624), with spark provided in the stable region (e.g., spark retard is less than first, lower spark retard threshold 620). A corresponding torque ratio is provided (plot 610) that is less than 1, as the spark timing (plot 618) is retarded from MBT, but greater than the threshold engine torque ratio (dashed line 612) and greater than the desired engine torque ratio (plot 608). The subsequent cylinder, cylinder 2, is provided spark with timing in the misfire region (e.g., spark retard is greater than the second, higher spark retard threshold 622). A controlled misfire occurs in this cylinder, resulting in zero torque produced by cylinder 2 for this firing event (plot 610). The next combustion event occurs in cylinder 1 (plot 624), with spark again provided in the stable region to produce a corresponding engine torque ratio (plot 610) that is greater than the desired engine torque ratio (plot 608). Spark is provided to cylinder 3 with timing in the misfire region, as shown in plot 618. A controlled misfire occurs in cylinder 3, producing zero torque (plot 610). Spark is provided to cylinder 4 in the stable region, and so combustion occurs in cylinder 4 with the corresponding amount of torque produced (plot 610) for the provided spark timing (plot 618), which is greater than the desired engine torque ratio (plot 608). Cylinder 2 is provided spark with timing in the misfire region, resulting in controlled misfire and, therefore, zero torque produced by cylinder 2 (plot 610). However, the average torque produced by the six firing events between t1 and t2 is equal to the desired engine torque ratio (plot 608). If the misfires had not been planned and controlled, the misfire count would be incremented with each misfire, as indicated by dashed segment 616. For example, if spark were provided in the unstable region, as indicated by a dashed X in plot 618, misfire may have randomly occurred, resulting in the misfire count being incremented. However, since the misfire is planned by the controller, the misfires are not added to the misfire count (plot 614), and the misfire count remains constant. Note that in the example of FIG. 6, misfire events are alternated with torque-producing combustion events, producing a symmetric pattern; however, in other examples, more than one misfire event or torque-producing combustion events may occur in a row, producing an asymmetric pattern.

Shortly before t2 and after the cylinder 2 firing event, the desired engine torque ratio (plot 608) increases. For example, following the engine torque reduction through spark retard, air flow, AFR, and MBT timing may be adjusted to reflect the driver demand (plot 604); thus, the desired engine torque ratio may be increased. Beginning at t2, the desired engine torque ratio is equal to one (note that while the desired engine torque ratio is the same at t2 as prior to t1, the total amount of torque produced by the engine may be different). Spark is provided at or near MBT, as shown in plot 618, to provide an engine torque ratio of 1 (plot 610).

Between t2 and t3, the accelerator pedal position increases (plot 604), indicating increased driver-demanded torque. In order to provide the increased driver-demanded torque, the engine speed (not shown) may increase. The engine may reach a threshold speed at which a transmission gear upshift is initiated in order to shift to a higher gear (with a lower gear ratio), thereby decreasing the engine speed while enabling vehicle acceleration. To prepare for the shift event, beginning at t3, a quick reduction in engine torque is requested (plot 608) over four firing events to allow for a smooth, imperceptible shift. The desired reduced engine torque ratio is below the engine torque ratio threshold 612 but is greater than zero torque, indicating that the spark timing to produce the desired engine torque ratio would lie in the unstable region. Therefore, the controller again uses the algorithm to determine spark timings that will provide the desired engine torque ratio over a plurality of combustion cycles (e.g., four combustion cycles).

The first combustion event after t3 occurs in cylinder 3. The controller rounds the spark timing for cylinder 3 down to the misfire region (plot 618). Controlled misfire occurs in cylinder 3, producing no torque (plot 610). The next combustion event occurs in cylinder 4, with spark provided in the stable region (plot 618), producing a corresponding engine torque ratio (plot 610) that is above the engine torque ratio threshold 612. Next, misfire occurs in cylinder 2 due to spark being provided in the misfire region, as shown in plot 618. Spark is then provided to cylinder 1 in the stable region, producing an engine torque ratio (plot 610) that is greater than the engine torque ratio threshold (dashed line 612). The average engine torque ratio produced over the four firing events is equal to the desired reduced engine torque ratio (plot 608). As before, instead of adding the planned misfires to the misfire count (as indicated by dashed segment 616), the misfire count does not increase (plot 614).

Following the upshift event, in which the higher gear is engaged (plot 602), the desired engine torque ratio (plot 608) is increased and returns to 1. Thus, at t4, spark timing is returned to MBT (plot 618) in order to maximize engine efficiency for the engine operating conditions and provide an engine torque ratio of one (plot 610).

At t4, there is an abrupt decrease in driver-demanded torque, as shown by the sharp decrease in pedal position (plot 604). Responsive to the decrease in driver-demanded torque, reduced engine torque is requested. The tip-out event is smaller at t4 than at t1, and therefore, the desired engine torque ratio (plot 608) is reduced to a smaller degree. The desired torque ratio (plot 610) is above the engine torque ratio threshold 612, making the corresponding spark timing lower than the first, lower spark retard threshold 620. Therefore, spark is provided at the corresponding spark timing (plot 618) in each cylinder (e.g., cylinder 4 and cylinder 2), producing an engine torque ratio (plot 610) equal to the desired engine torque ratio (plot 608).

At t5, a second tip-out event occurs, as demonstrated by a rapid decrease in accelerator pedal position (plot 604). However, the tip-out event at t5 is smaller in magnitude than the tip-out event at t1. A quick reduction in engine torque requested, as shown in plot 608, with a smaller magnitude than at t1, corresponding to the smaller magnitude tip-out at t5. The desired reduced engine torque ratio is above the engine torque ratio threshold (dashed line 612), indicating that the spark timing to provide the desired engine torque ratio is below the first, lower spark retard threshold 620 and not in the unstable region. Therefore, spark is provided (plot 618) to each cylinder (e.g., cylinder 4 and cylinder 2) at the spark timing corresponding to the desired engine torque ratio (plot 608), and the actual engine torque ratio (plot 610) is equal to the desired engine torque ratio.

In this way, during a first condition, an estimated spark timing retard is applied to each cylinder over an engine cycle, such as for the second tip-out event at t5, and during a second condition, the spark timing retard applied to each cylinder over the engine cycle is individually adjusted while maintaining an average spark timing retard over the engine cycle at the estimated spark timing retard, such as for the tip-out event at t1 and the transmission gear upshift initiated at t3. During the first condition, the estimated spark timing retard is outside of a first region (e.g., the unstable region) between an upper threshold (e.g., second, higher spark retard threshold 622) and a lower threshold (e.g., first, lower spark retard threshold 620), both selected based on engine speed, and, during the second condition, the estimated spark timing retard is within the first region. The requested torque reduction is provided in both the first and the second conditions, with the requested torque reduction achieved during every firing event in the first condition and as an average over the firing events in the second condition.

FIG. 7 shows a graph 700 illustrating several example spark timing redistribution patterns that may be used to provide a reduced engine torque ratio that has a corresponding spark timing in the unstable region. For example, the spark timing redistribution patterns may be generated by a controller (e.g., controller 12 of FIG. 2) via an algorithm (e.g., algorithm 500 of FIG. 5) in order to provide the reduced engine torque ratio, on average, over an engine cycle of a 4-cylinder engine. The unstable region is bounded by a lower spark retard threshold (dashed line 702), which may correspond to the first, lower spark retard threshold 410 of FIG. 4 and an upper spark retard threshold (dashed line 704), which may correspond to the second, higher spark retard threshold 412 of FIG. 4. Combustion is predicted to be stable when spark timing is below the lower threshold, and misfire is predicted to occur when spark timing is above the upper threshold, as described further with respect to FIG. 4. One engine cycle of a 4-cylinder engine is shown as a non-limiting example, and spark timing redistribution for engine torque reduction may also be used in engines with a different number of cylinders and/or over a different number of engine cycles.

Spark retard from MBT is shown in plots 710, 712, 714, and 716, with each X representing one firing event at the indicated spark timing and spark retard from MBT increasing up the Y-axis from bottom to top. In particular, plot 710 shows a desired spark retard timing, plot 712 shows a first option for spark retard from MBT via spark timing redistribution, plot 714 shows a second option for spark retard from MBT using spark timing redistribution, and plot 716 shows a third option for spark retard from MBT using spark timing redistribution. In each option, a first number of cylinders is selected to have spark timing above the upper spark retard threshold 704, a second number of cylinders is selected to have spark timing below the lower spark retard threshold 702, and the average spark retard timing across the four firing events is equal to the desired spark retard timing of plot 710. Further, a catalyst temperature (Tcat) corresponding to each spark timing redistribution option is shown in plots 712a (solid line), 712b (dotted line), 714a (long dash-short dash line), 714b (dot-dash line), and 716a (short dashed line), as will be elaborated below, with catalyst temperature increasing up the Y-axis from bottom to top. A first threshold catalyst temperature, indicated by dashed line 706, corresponds to a temperature above which the catalyst may be degraded. A second threshold catalyst temperature, indicated by dashed line 708, corresponds to a threshold temperature for reducing the first number of cylinders (e.g., the number of cylinders with spark retard timing above the upper threshold 704) and increasing the second number of cylinders (e.g., the number of cylinders with spark retard timing below the lower threshold 702). For all of the above, the Y-axis shows the cylinder number (1, 3, 4, 2) for each firing event.

The desired spark retard from MBT (plot 710), in which all four cylinders are provided spark at the same retarded timing, is within the unstable region (e.g., below the upper threshold 704 and below the lower threshold 702). If spark were provided at this timing, random misfires may occur, which may produce an unpredictable amount of torque. Therefore, the controller redistributes the spark timing across the four cylinders to provide the desired spark retard timing, on average, and desired engine torque ratio corresponding to the desired spark retard timing, on average, over the engine cycle.

Option 1 (plot 712) shows an asymmetric pattern of spark timing redistribution in which the first number of cylinders is one (cylinder 3) and the second number of cylinders is three (cylinders 1, 4, and 2). Cylinder 3 has a spark retard timing above the upper threshold 704, resulting in a controlled misfire and zero torque produced by cylinder 3. Further, $T_{cat}$ increases (plot 712a) following the controlled misfire in cylinder 3. Cylinders 1, 4, and 2 have the same spark retard timing that is below the lower threshold 702. Combustion occurs in cylinders 1, 4, and 2, producing the same engine torque ratio for each. Note that in other examples, cylinders 1, 4, and 2 need not have the same spark retard timing as long as the overall average spark timing (and thus, the overall average engine torque ratio) is equal to the desired spark timing (and desired engine torque ratio). As an example, the spark timing of cylinder 1 may be adjusted closer to the lower threshold 702 (e.g., more retarded relative to MBT), producing less torque, while the spark timing of cylinder 4 may be adjusted farther from the lower threshold 702 (e.g., less retarded relative to MBT), producing more torque.

Option 2 (plot 714) shows a symmetric pattern of spark timing redistribution in which the first number of cylinders is two (cylinders 1 and 4) and the second number of cylinders is two (cylinders 3 and 2), with controlled misfire events alternating with torque production events. Cylinder 1 has a spark retard timing above the upper threshold 704, resulting in a controlled misfire and zero torque produced by cylinder 1. Further, $T_{cat}$ increases (plot 714a) following the controlled misfire in cylinder 1. Cylinder 3 has a spark retard timing below the lower threshold 702, resulting in combustion that produces a corresponding engine torque ratio. Like cylinder 1, cylinder 4 has a spark retard timing above the upper threshold 704, resulting in a controlled misfire and zero torque produced by cylinder 4 and another increase in $T_{cat}$ (plot 714a). Cylinder 2 has a spark retard timing below the lower threshold 702 that is less retarded from MBT than the spark retard timing of cylinder 3, resulting in combustion that produces a corresponding engine torque ratio that is greater than the engine torque ratio produced by cylinder 3. Note that in other examples, cylinders 3 and 2 may have the same spark retard timing as long as the overall average spark timing is equal to the desired spark timing.

In the examples described above, the starting catalyst temperature is below the second threshold catalyst temperature 708, enabling both option 1 (plot 712a) and option 2 (plot 714a). However, if the starting catalyst temperature were higher than the second threshold catalyst temperature 708, as in plots 712b (option 1) and 714b (option 2), the two controlled misfires of option 2 may cause $T_{cat}$ to exceed the first threshold catalyst temperature 706, as shown in plot 714b, which may degrade the catalyst. Therefore, the controller may choose option 1 to prevent catalyst degradation.

Option 3 (plot 716) shows another symmetric pattern of spark timing redistribution in which the first number of cylinders is two (cylinders 3 and 4) and the second number of cylinders is two (cylinders 1 and 2). However, unlike option 2, there are two controlled misfire events in a row instead of alternating controlled misfires with torque production events. Cylinder 1 has a spark retard timing below the lower threshold 702, resulting in combustion that produces a corresponding engine torque ratio that is greater than the desired torque ratio. Cylinders 3 and 4 both have a spark retard timing that is above the upper threshold 704, resulting in controlled misfires in cylinders 3 and 4 and zero torque produced by the two firing events. Further, $T_{cat}$ increases (plot 716a) following the each controlled misfire. Cylinder 2 has the same spark retard timing below the lower threshold 702 as cylinder 1, resulting in combustion that produces the same engine torque ratio as cylinder 1. Note that in other examples, cylinders 1 and 2 may have different spark retard timings as long as the overall average spark timing is equal to the desired spark timing, as described above. Further, if the starting catalyst temperature were greater than the second threshold catalyst temperature 708, the controller may decrease the first number of cylinders and not perform the pattern demonstrated by option 3, as also described above.

In this way, any engine torque ratio may be achieved through spark retard usage. By providing spark in the stable region and the misfire region but not in the unstable region, random misfire, and therefore unpredictable torque production, may be avoided. By providing spark to some cylinders in the misfire region, controlled misfire events where zero torque is produced can be used to offset excess torque produced in other cylinders where spark timing is moved to a higher torque ratio. Through spark timing redistribution, torque is provided in a predictable amount, including zero torque when spark is provided in the misfire region. The technical effect of averaging torque production over a plurality of firing events in order to avoid providing spark timing in an unstable region is that torque may be predictably provided at any torque ratio.

In one example, a method for an engine is provided, comprising: responsive to an estimated spark timing for a requested torque reduction being between an upper threshold and a lower threshold, adjusting a spark timing for each firing event of a plurality of firing events to bring an average spark timing over the plurality of firing events to the estimated spark timing. In the preceding example, additionally or optionally, adjusting the spark timing for each firing event of the plurality of firing events includes adjusting spark timing for each of a plurality of cylinders over an engine cycle, each of the plurality of cylinders firing once over the engine cycle. In any or all of the preceding examples, additionally or optionally, the adjusting spark timing for each of the plurality of cylinders includes adjusting the spark timing of a first number of the plurality of cylinders to above the upper threshold while adjusting the spark timing of a second, remaining number of the plurality of cylinders to below the lower threshold. In any or all of the preceding examples, additionally or optionally, a torque ratio when the adjusted spark timing is above the upper threshold is lower than the torque ratio when the estimated spark timing is between the upper threshold and the lower threshold, and the torque ratio when the adjusted spark timing is below the lower threshold is higher than the torque ratio when the estimated spark timing is between the upper threshold and the lower threshold. In any or all of the preceding examples, additionally or optionally, the first number and the second number are selected based on a distance of the estimated spark timing from each of the upper and the lower threshold. In any or all of the preceding examples, additionally or optionally, the first number is increased while the second number is decreased as the distance of the target spark timing from the upper threshold decreases, and the second number is increased while the first number is decreased as the distance of the target spark timing from the lower threshold decreases. In any or all of the preceding examples, additionally or optionally, a random misfire occurrence is higher when the estimated spark timing is between the upper threshold and the lower threshold and a controlled misfire occurrence is higher when the adjusted spark timing is above the upper threshold, the method further comprising, not incrementing a misfire counter responsive to a misfire indication received while operating with the adjusted spark timing. In any or all of the preceding examples, the method additionally or optionally comprises monitoring an exhaust catalyst temperature while operating with the adjusted spark timing, and responsive to the exhaust catalyst temperature rising above a threshold temperature, reducing the first number of the plurality of cylinders with adjusted spark timing above the upper threshold while increasing the second number of the plurality of cylinders with adjusted spark timing below the lower threshold. In any or all of the preceding examples, the method additionally or optionally comprises estimating each of the upper and lower thresholds based on each of engine speed, engine load, and engine temperature, the upper threshold and the lower threshold raised as the engine load increases. In any or all of the preceding examples, additionally or optionally, the requested torque reduction is responsive to one of a transmission gear upshift and an operator pedal tip-out, the method further comprising estimating the requested torque reduction based on each of an initial and a final gear of the transmission gear upshift when the requested torque reduction is responsive to the transmission gear upshift, and estimating the requested torque reduction based on each of an initial and a final pedal position when the requested torque reduction is responsive to the operator pedal tip-out.

As another example, a method is provided, comprising: estimating spark timing retard from MBT based on a requested torque reduction; during a first condition, applying the estimated spark timing retard to each cylinder over an engine cycle; and during a second condition, individually adjusting the spark timing retard applied to each cylinder over the engine cycle while maintaining an average spark timing retard over the engine cycle at the estimated spark timing retard. In the preceding example, additionally or optionally, during the first condition, the estimated spark timing retard is outside a first region between an upper threshold and a lower threshold selected based on each of engine speed, engine load, engine temperature, and fuel alcohol content, and during the second condition, the estimated spark timing retard is within the first region, and the requested torque reduction is provided in both the first and the second conditions. In any or all of the preceding examples, additionally or optionally, adjusting the spark timing retard during the second condition includes increasing the spark timing retard applied to a first set of cylinders into a second region above the upper threshold, and decreasing the spark timing retard applied to a second set of cylinders into a third region below the lower threshold. In any or all of the preceding examples, the method additionally or optionally further comprises selecting an identity and number of cylinders in each of the first and second set of cylinders based on a distance of the estimated spark timing retard from each of the upper and the lower threshold. In any or all of the preceding examples, the method additionally or optionally further comprises adjusting the identity and number of cylinders in each of the first and second set of cylinders responsive to exhaust catalyst temperature above a threshold temperature. In any or all of the preceding examples, the method additionally or optionally further comprises, during the first condition, responsive to an indication of misfire, incrementing a misfire counter, and during the second condition, responsive to the indication of misfire, not incrementing the misfire counter.

As another example, an engine system is provided, comprising an engine including a plurality of cylinders; a spark plug coupled to each of the plurality of cylinders; a transmission; and a controller with computer-readable instructions for: responsive to a change in driver demand, commanding a transmission upshift to a lower gear ratio; estimating a torque reduction based on the transmission upshift; and adjusting a spark timing for each of the plurality of cylinders on a cylinder-by-cylinder basis to provide an average spark timing retard that generates the estimated torque reduction. In the preceding example, additionally or optionally, the controller includes further instructions for estimating each of an upper and a lower threshold for spark timing retard based on engine speed, engine load, engine temperature, and fuel alcohol content, and wherein the adjusting is responsive to the average spark timing retard falling between the upper and the lower thresholds. In any or all of the preceding examples, additionally or optionally, the adjusting includes: operating a first set of the plurality of cylinders with a first spark timing retard above the upper threshold; and operating a second set of the plurality of cylinders with a second spark timing retard below the lower threshold, wherein a number and identity of cylinders in each of the first and second set is selected based on the average spark timing retard relative to each of the upper and the lower threshold. In any or all of the preceding examples, the controller additionally or optionally includes further instructions for: monitoring an exhaust temperature; and responsive to the monitored exhaust temperature exceeding a threshold temperature, increasing the number of cylinders in the second set while decreasing the number of cylinders in the first set.

In another representation, the vehicle system is a hybrid vehicle system. In yet another representation, a method for an engine comprises: estimating spark timing retard from MBT based on a requested torque reduction; responsive to the estimated spark timing retard falling outside a range, applying the estimated spark timing retard to each cylinder over an engine cycle; and responsive to the estimated spark retard timing falling inside the range, adjusting the spark timing retard applied to each cylinder, individually, over the engine cycle while maintaining an average spark timing retard over the engine cycle at the estimated spark timing retard.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
responsive to an estimated spark timing for a requested torque reduction being between an upper threshold and a lower threshold, adjusting a spark timing for each firing event of a plurality of firing events to bring an average spark timing over the plurality of firing events to the estimated spark timing;
incrementing a misfire counter responsive to an indication of misfire while operating with the adjusted spark timing below the lower threshold; and not incrementing the misfire counter responsive to the indication of misfire while operating with the adjusted spark timing above the upper threshold.

2. The method of claim 1, wherein adjusting the spark timing for each firing event of the plurality of firing events includes adjusting spark timing for each of a plurality of cylinders over an engine cycle, each of the plurality of cylinders firing once over the engine cycle.

3. The method of claim 2, wherein adjusting the spark timing for each of the plurality of cylinders includes adjusting the spark timing of a first number of the plurality of cylinders to above the upper threshold while adjusting the spark timing of a second, remaining number of the plurality of cylinders to below the lower threshold.

4. The method of claim 3, wherein a torque ratio when the adjusted spark timing is above the upper threshold is lower than the torque ratio when the estimated spark timing is between the upper threshold and the lower threshold, and wherein the torque ratio when the adjusted spark timing is below the lower threshold is higher than the torque ratio when the estimated spark timing is between the upper threshold and the lower threshold.

5. The method of claim 3, wherein the first number and the second number are selected based on a distance of the estimated spark timing from each of the upper and the lower threshold.

6. The method of claim 5, wherein the first number is increased while the second number is decreased as the distance of the estimated spark timing from the upper threshold decreases, and wherein the second number is increased while the first number is decreased as the distance of the estimated spark timing from the lower threshold decreases.

7. The method of claim 5, wherein a random misfire occurrence is higher when the estimated spark timing is between the upper threshold and the lower threshold and a controlled misfire occurrence is higher when the adjusted spark timing is above the upper threshold.

8. The method of claim 7, further comprising monitoring an exhaust catalyst temperature while operating with the adjusted spark timing, and responsive to the exhaust catalyst temperature rising above a threshold temperature, reducing the first number of the plurality of cylinders with adjusted spark timing above the upper threshold while increasing the second number of the plurality of cylinders with adjusted spark timing below the lower threshold.

9. The method of claim 1, further comprising estimating each of the upper and lower thresholds based on each of engine speed, engine load, and engine temperature, the upper threshold and the lower threshold raised as the engine load increases.

10. The method of claim 1, wherein the requested torque reduction is responsive to one of a transmission gear upshift and an operator pedal tip-out, the method further comprising estimating the requested torque reduction based on each of an initial and a final gear of the transmission gear upshift when the requested torque reduction is responsive to the transmission gear upshift, and estimating the requested torque reduction based on each of an initial and a final pedal position when the requested torque reduction is responsive to the operator pedal tip-out.

11. A method, comprising:
estimating spark timing retard from MBT based on a requested torque reduction;
during a first condition, applying the estimated spark timing retard to each cylinder over an engine cycle and incrementing a misfire counter responsive to an indication of misfire; and
during a second condition, individually adjusting the spark timing retard applied to each cylinder over the engine cycle while maintaining an average spark timing retard over the engine cycle at the estimated spark timing retard and not incrementing the misfire counter responsive to the indication of misfire.

12. The method of claim 11, wherein, during the first condition, the estimated spark timing retard is outside a first region between an upper threshold and a lower threshold selected based on each of engine speed, engine load, engine temperature, and fuel alcohol content, and during the second condition, the estimated spark timing retard is within the first region, and wherein the requested torque reduction is provided in both the first and the second conditions.

13. The method of claim 12, wherein adjusting the spark timing retard during the second condition includes increasing the spark timing retard applied to a first set of cylinders into a second region above the upper threshold, and decreasing the spark timing retard applied to a second set of cylinders into a third region below the lower threshold.

14. The method of claim 13, further comprising selecting an identity and a number of cylinders in each of the first and second set of cylinders based on a distance of the estimated spark timing retard from each of the upper and the lower threshold.

15. The method of claim 14, further comprising adjusting the identity and the number of cylinders in each of the first and second set of cylinders responsive to exhaust catalyst temperature above a threshold temperature.

16. An engine system, comprising:
an engine including a plurality of cylinders;
a spark plug coupled to each of the plurality of cylinders;
a transmission; and
a controller with computer-readable instructions stored in non-transitory memory that, when executed, cause the controller to:
responsive to a change in driver demand, command a transmission upshift to a lower gear ratio;
estimate a torque reduction based on the transmission upshift;
adjust a spark timing for each of the plurality of cylinders on a cylinder-by-cylinder basis to provide an average spark timing retard that generates the estimated torque reduction; and
increment a misfire counter in response to an indication of misfire in a first set of the plurality of cylinders and not increment the misfire counter in response to the indication of misfire in a second, remaining set of the plurality of cylinders while adjusting the spark timing for each of the plurality of cylinders on the cylinder-by-cylinder basis.

17. The system of claim 16, wherein the controller includes further instructions stored in non-transitory memory that, when executed, cause the controller to estimate each of an upper and a lower threshold for spark timing retard based on engine speed, engine load, engine temperature, and fuel alcohol content, and wherein the instructions that cause the controller to adjust the spark timing for each of the plurality of cylinders on the cylinder-by-cylinder basis are executed responsive to the average spark timing retard falling between the upper and lower thresholds.

18. The system of claim 17, wherein the instructions that cause the controller to adjust the spark timing for each of the plurality of cylinders on the cylinder-by-cylinder basis include further instructions stored in non-transitory memory, that, when executed, cause the controller to:
operate the first set of the plurality of cylinders with a first spark timing retard below the lower threshold; and
operate the second set of the plurality of cylinders with a second spark timing retard above the upper threshold, wherein a number and an identity of cylinders in each of the first and second set are selected based on the average spark timing retard relative to each of the upper and the lower threshold.

19. The system of claim 18, wherein the controller includes further instructions stored in non-transitory memory that, when executed, cause the controller to:
monitor an exhaust temperature; and
responsive to the monitored exhaust temperature exceeding a threshold temperature, increase the number of cylinders in the first set while decreasing the number of cylinders in the second set.

* * * * *